W. G. LEATHERS.
SPEEDOMETER.
APPLICATION FILED AUG. 8, 1912.
1,147,329.
Patented July 20, 1915.
2 SHEETS—SHEET 1.
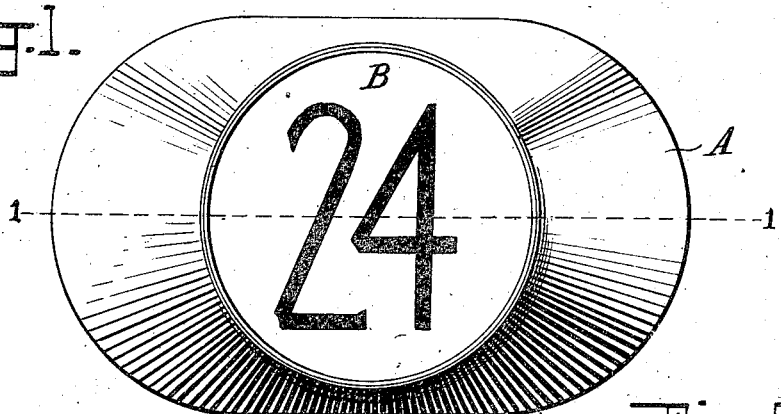
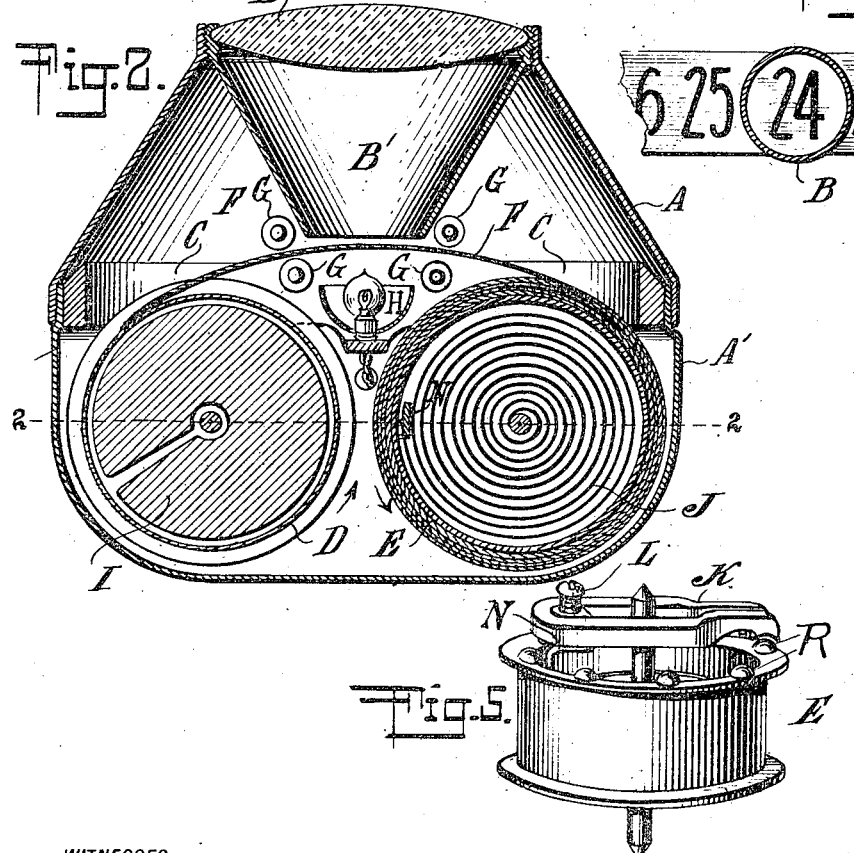
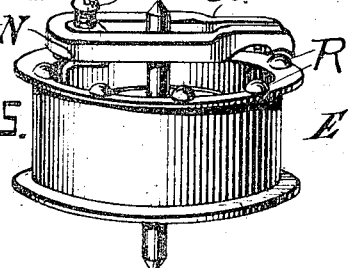
WITNESSES
INVENTOR
Ward G. Leathers W. G. LEATHERS.
SPEEDOMETER.
APPLICATION FILED AUG. 8, 1912.
1,147,329.
Patented July 20, 1915.
2 SHEETS—SHEET 2.
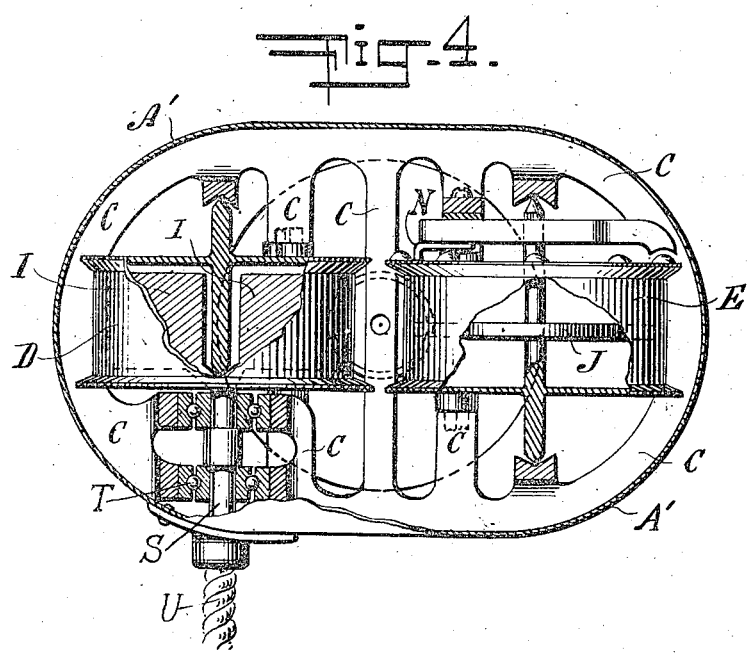
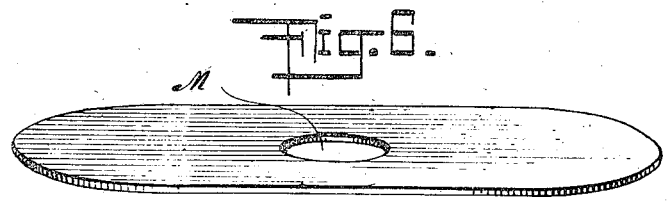

United States Patent Office.

WARD G. LEATHERS, OF NEW YORK, N. Y., ASSIGNOR TO STEWART-WARNER SPEEDOMETER CORPORATION, OF CHICAGO, ILLINOIS, A CORPORATION OF VIRGINIA.

SPEEDOMETER.

1,147,329.

Specification of Letters Patent.

Patented July 20, 1915.

Application filed August 8, 1912. Serial No. 714,128.

*To all whom it may concern:*

Be it known that I, WARD G. LEATHERS, a citizen of the United States, residing in the city of New York, borough of Manhattan, county and State of New York, have invented a certain new and useful Speedometer, of which the following is a specification.

This invention is a speedometer, the same being particularly adapted for use on motor-driven vehicles, such as automobiles.

The speedometers now in use on automobiles are characterized chiefly by the use of indicating members, the figures and graduations of which are so small in size that they cannot be read without requiring fixed attention by the driver. As is well known, the indications given out by a speedometer vary or fluctuate within wide limits, particularly when an automobile is traveling through the streets of a city or village, such variation being due to the necessity for slowing down the automobile at street crossings, to stop in order that other vehicles and pedestrians may cross a roadway, to reduce the speed in compliance with the legal speed requirements, etc. Owing to such variations in the speed, the driver is required to constantly watch the instrument, but when it is considered that the driver must also give strict attention to the road ahead, and to manipulate various levers for controlling the clutch and brake of the machine, as well as to give warning signals, it will be apparent that very little time can be devoted to inspecting the speedometer readings.

The object of the invention is to enable the driver to read the speed indications by merely glancing at the instrument, and, furthermore, to simplify the device as to render it compact, efficient and reliable.

The invention, in a broad aspect, embodies indicating means the numbers of which represent the speed at which the machine is traveling and which numbers vary with the speed of the car, in combination with means for enlarging the numbers of said indicating means to the end that the readings will be plainly visible to the driver, whereby a relatively small and compact instrument is produced and one which the driver can inspect without requiring fixed attention, thus leaving the driver free to give attention to the manifold duties required in the operation of the car.

The invention consists further of a band or ribbon of translucent, flexible material, preferably celluloid, which contains a figure for the indicating of each mile per hour of speed from zero to the maximum capacity of the instrument such as 60, 80, or 100 miles. This band or ribbon is used in combination with a means for imparting a forward movement to it in proportion to the speed of the vehicle, and with a retarding force preferably a spring for the purpose of returning it to zero. It is also provided with a means for making that movement intermittent so that one number at a time appears before the observer. This intermittent mechanism is in no way necessary to the successful working of the instrument.

All the above will be hereinafter more fully explained.

Other features of the invention and the advantages thereof will appear in the annexed detailed description.

In the accompanying drawing I have illustrated one practical embodiment of the invention, but the construction shown therein is to be understood as illustrative only, and not as defining the limits of the invention.

Figure 1 is a plan view of the outside of the speedometer as seen by the driver of the vehicle. Fig. 2 is a vertical cross section of the instrument taken at the line 1—1 of Fig. 1 and shows in the main its working parts. Fig. 3 is a section of the ribbon or translucent band about actual size. Fig. 4 is a horizontal cross section taken at the line 2—2 of Fig. 2 as seen from the rear. Fig. 5 is a perspective view of the drum E showing the magnetic means of obtaining the intermittent movement. Fig. 6 is the perspective view of a shield for limiting the field of vision and may be used in place of the lens-tube.

The several working parts are housed within a substantially dust-tight casing composed mainly of two sections A and A', said sections being separately coupled together in any suitable way.

The form and size of the members composing the casing may be varied within wide limits but it is preferred to employ the shape shown, as it very compactly houses the mechanism.

The upper portion of the case is a modified tapered cone, the upper or smaller end of which is adapted for the accommodation of the lens B.

The lens is constructed of suitable form to magnify the numbers on an indicating mechanism. With the lens-incasing member A is associated a lens-tube B', the latter extending into the chamber of the casing and terminating a suitable distance above the indicating mechanism; the main function of said lens-tube being to limit the field of vision at any particular moment.

As shown, the lens-tube tapers from its upper to its lower extremity and is mounted or supported within the upper aperture of casing member A, and the lens B is secured in the upper part of said lens-tube. Obviously the particular manner of supporting the lens and the lens-tube may be modified by a skilled constructor.

Within member A' of the casing is a fixed frame member C which may be in the form of a modified ellipse with numerous projections for supporting the bearings shown more particularly in Fig. 4.

Within the main cavity surrounded by the casing member A' are two cylindrical drums, D and E of approximately similar diameter. These drums are supported on bearings and furnished with flared rims for the purpose of guiding and supporting the translucent ribbon F which is rolled from one drum to the other and back again when the vehicle starts, goes, and stops. (The ribbon is not shown in Fig. 4.)

At G—G—G—G will be seen the guide rolls which maintain the proper distance between the translucent ribbon and the lens-tube keeping the indicating means always at the proper focal distance from the lens.

This speedometer is provided with an electric light and reflector shown at H from which position it throws its rays through the translucent indicating ribbon.

The drum D surrounds the revolving permanent magnet I which furnishes the motive force. The magnet I is driven by the usual method. It is mounted on the end of a shaft S supported in bearings T and attached to a flexible shaft U carried in a flexible tube and geared to one of the wheels of the vehicle.

As is well known, as the magnet I revolves the magnetic torque produced on the drum D increases or decreases in proportion to the speed of the magnet I. As the drum D turns in the direction of the arrow, it winds about its periphery the translucent ribbon containing the indicating figures. As the drum D revolves and rolls the ribbon about itself, it is necessary for the cylinder E to revolve in the same direction as it pays out the ribbon.

When the magnet I is not revolving, that being when the vehicle is not in motion, nearly all of the translucent ribbon is wound around the periphery of the drum E. Inside the drum E is provided a long, sensitive, coil spring J, the purpose of which is to return the indicating mechanism to zero. One end of the spring J is made fast in a permanent position by the finger N.

In Fig. 5, may be seen the means for obtaining an intermittent movement by means of which one figure, corresponding to a given number of miles per hour traveled by the vehicle, is directly beneath the lens-tube. K is a permanent horse-shoe magnet fastened to the frame C by means of the screw L or by any other suitable means. The ends of the magnet are adapted to hold small, soft iron pieces R in the center of their magnetic field. These small iron pieces are attached to the drum E and revolve with it, and are arranged at equal intervals as nearly as possible corresponding to the distance between the indicating figures on the ribbon.

In Fig. 3 may be seen a section of the translucent ribbon approximately actual size. Figures are shown which indicate speed of 22 to 26 miles per hour. Surrounding the figure 24 may be seen a ring B' which corresponds to the lower end of the lens tube B'. The figures on the ribbon corresponding each to a given speed are arranged at such intervals as will cause them to stop directly beneath the lens-tube when the soft iron pieces come directly beneath the points of the permanent magnet K.

Other means than the lens-tube may be used for restricting the vision to approximately a single reading and as one of the many possible modifications I present the shield shown in Fig. 6 wherein the reading is made through the aperture M.

While I have indicated and described a magnetic device operated by a flexible shaft for imparting movement to the magnet I, it is evident that any of the usual mechanically driven devices may be substituted therefor.

Having thus fully described the invention, what I claim as new, and desire to secure by Letters Patent is:

1. In a speedometer the combination of indicating means comprising a band provided with characters for denoting the speed of a vehicle, and means for actuating the indicating means to change the position of the latter with the speed of the vehicle, comprising drums to which the ends of the band are connected, magnetic means acting to wind the band on one drum and a coil spring on the shaft of the other drum acting to wind it up thereon.

2. In a speedometer the combination of movable indicating means provided with characters for denoting the speed of a vehicle and arranged in sequential indicating position, and means to move the indicating means to change the position of the latter with the speed of the vehicle, comprising magnetic means to yieldingly force the indicating means from one of its indications to another, and means tending to retain the indicating means in a fixed position by tending to prevent movement thereof forwardly and backwardly.

3. In a speedometer the combination of movable indicating means provided with characters for denoting the speed of a vehicle and arranged in sequential indicating positions, means to move the indicating means to change the position of the latter with the speed of the vehicle, comprising magnetic means to yieldingly force the indicating means from one of its indications to another, and a fixed magnet and a body of magnetic material supported so as to be movable with the indicating means tending to retain the indicating means in a fixed position.

4. In a speedometer the combination of movable indicating means provided with characters for denoting the speed of a vehicle and arranged in sequential indicating positions, and means to move the indicating means to change the position of the latter with the speed of the vehicle, comprising a rotatable magnet tending to move the indicating means in one direction, and a coiled spring tending to move it in the other direction, to yieldingly force the indicating means from one of its indications to another, and means tending to retain the indicating means in a fixed position by tending to prevent movement thereof forwardly and backwardly.

5. In a speedometer, the combination of movable indicating means provided with characters for denoting the speed of the vehicle and arranged in sequential indicating positions, means to move the indicating means to change the position of the latter with the speed of the vehicle, comprising a rotatable magnet tending to move the indicating means in one direction and a coiled spring tending to move it in the other direction, to yieldingly force the indicating means from one of its indications to another, and a fixed magnet and body of magnetic material supported so as to be movable with the indicating means and tending to retain the indicating means in a fixed position.

In testimony whereof I have signed my name to this specification in the presence of two subscribing witnesses.

WARD G. LEATHERS.

Witnesses:
   E. C. SCARLETT,
   ALEXANDER C. WILEY.